April 23, 1935.  A. Y. DODGE  1,998,660
BRAKE
Filed June 16, 1930
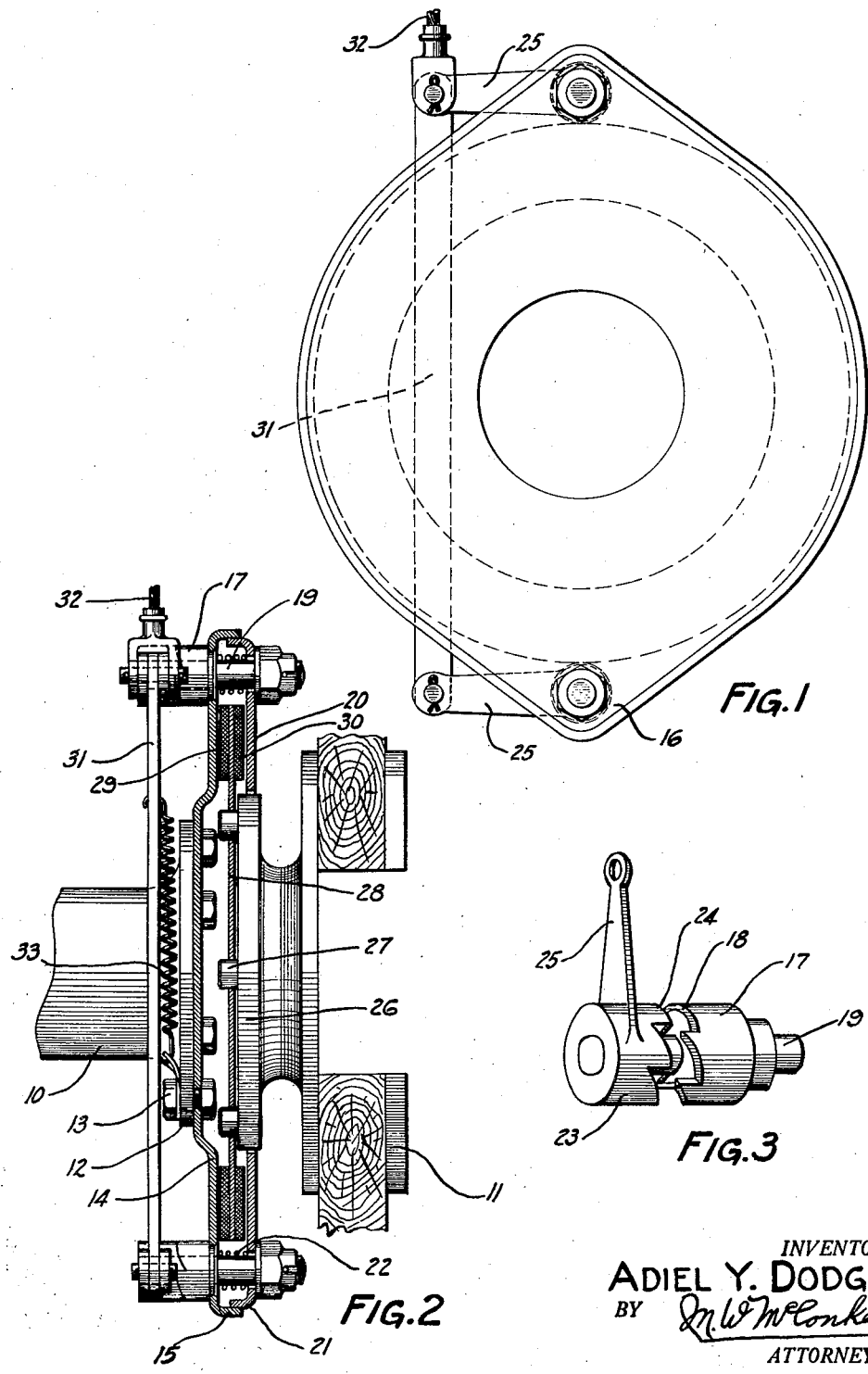
INVENTOR.
ADIEL Y. DODGE Patented Apr. 23, 1935

1,998,660

UNITED STATES PATENT OFFICE 1,998,660

BRAKE

Adiel Y. Dodge, South Bend, Ind., assignor to Bendix Brake Company, South Bend, Ind., a corporation of Illinois Application June 16, 1930, Serial No. 461,370

5 Claims. (Cl. 188—72)

This invention relates to brakes and more particularly to disc brakes.

The invention broadly comprehends two stamped discs one secured to an axle flange and another axially movable and secured against rotation by members which also provide the actuating means and means for adjusting the relative position of one to the other. These discs house a third disc suitably secured to a rotatable member such as a wheel and housed between the fixed and movable discs.

An object of the invention is to provide an efficient brake of the disc type completely housed against the elements of the weather.

Another object of the invention is to provide a brake comprising relatively few parts, including a member rotatable with a wheel, a fixed member and a movable member enveloping the rotatable member and means associated therewith for engaging the fixed and axially movable members with the rotatable member.

Another object of the invention is to provide a brake of the disc type in which the maximum cooling of the braking elements is secured.

A further object of the invention is to provide a disc brake which is highly efficient in operation and yet of marked simplicity as a whole and in respect to each of its component parts, so that its manufacture may be economically facilitated, both as regards to parts and their assembly.

Other objects of the invention will appear from the following description taken in connection with the drawing which forms a part of this specification, and in which:

Figure 1 is a side elevation of a brake mechanism illustrating the operating means;

Figure 2 is a side elevation of an axle having a wheel positioned thereon and a brake mechanism associated therewith, the brake mechanism being shown in section; and Figure 3 is a perspective view of one of the operating members.

Referring to the drawing for more specific details of the invention, 10 represents an axle housing and 11 a wheel mounted on an axle, not shown. The axle housing 10 is provided with a circumferential flange 12 to which is secured, as by bolts 13, a stamped disc 14, having a peripheral flange 15, which lends strength and rigidity thereto.

As shown, the disc 14 is provided with diametrally disposed ears or lugs 16 apertured to receive fixed sleeves 17 having cam faces 18 and studs 19 are positioned for reciprocation in the sleeves. These studs support for axial movement a disc 20 having a peripheral flange 21 telescoping the peripheral flange 15 on the disc 14 and positioned on the studs 19 between the discs 14 and 20 are coil springs 22 tending to force the discs 14 and 20 apart. The studs 19 have positioned thereon for rotation sleeves 23 provided with cam faces 24, engaging the cam faces 18 on the sleeves 17. These sleeves are secured against displacement as by cotter pins and are provided with rock arms 25.

Suitably secured on the hub 26 of the wheel 11 as by pins 27 is a stamped disc 28 having frictional faces 29 and 30 adaptable for engagement with the discs 14 and 20. This disc is free to move axially on the pins 27 and is rotated thereby. The sleeves 23 are adapted to be rocked through the arms 25 and a connecting rod 31 attached to an operating cable 32 and the rod 31 is connected by a return spring 33 to a suitable fixed support such as one of the bolts 13 securing the disc 14 to the flange on the axle housing.

It will be observed that the discs 14 and 20 are each provided with peripheral flanges and that these flanges telescope to provide an adequate housing for the brake.

It will also be observed that the friction elements or facings are positioned on a disc intermediate the fixed disc and the axially movable disc and that the friction elements are arranged for engagement with the fixed and the movable discs upon application of the brake. By reason of this particular structure, the maximum cooling effect is secured because the rubbing surfaces radiate directly through the adjacent plates or discs to the outside air.

In operation, power is applied through the operating cable, the connecting rod and rock arms to rock the sleeves 23. This actuates the cams to move the disc 20 toward the disc 14 to engage the frictional faces on the disc 28. The springs 22 serve to return the disc to the normal position when the brake is released.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising, a fixed disc having a peripheral flange, sleeves carried by the disc, cam faces on the sleeves, studs positioned for movement in the sleeves, a disc carried by the studs having a peripheral flange telescoping the flange on the fixed disc, compression springs on the studs between the discs, a rotatably and axially movable disc between the fixed disc and the disc carried thereby, frictional faces on the rotatably and axially movable disc adapted to engage the fixed disc and the axially movable disc, sleeves positioned for rotation on the studs, cam faces on the sleeves positioned for rotation on the studs engaging the cam faces on the sleeves carried by the fixed disc, arms on the rotatable sleeves, a rod connecting the arms and an operating cable connected to one of the arms.

2. A brake comprising two members each having oppositely disposed protruding portions providing an irregular contour, and telescopic flanges on said members arranged around the edges thereof, a member positioned for axial and rotatable movements between the telescopic members and means carried by the protruding portions for engaging the telescopic members with the rotatable and axially movable members.

3. A brake comprising a fixed plate having diametrically disposed protruding portions and a relatively narrow peripheral flange, a plate supported by the fixed plate having diametrically disposed protruding portions and a narrow peripheral flange telescoping the flange on the fixed plate said flanges being irregular in contour and adapted to prevent relative rotation between the plates, a thin friction member positioned for rotation and axial movement between the plates and operating members supported by the protruding portions.

4. A brake comprising a fixed support, a rotatable member having lateral pins associated with the support, a plate on the fixed support having diametrically disposed protruding portions and a peripheral flange and a plate supported thereby having a peripheral flange telescoping the flange on the fixed plate said flanges being irregular in contour and adapted to prevent relative rotation between the plates, a disk axially movable on the pins on the rotatable member between the plates and means on the protruding portions for engaging the plates with the disk.

5. A brake comprising three members, two of which are non-rotatable and provided with oppositely disposed protruding portions providing an irregular contour, said non-rotatable members having telescopically arranged flanges about the edges thereof, the third being positioned for axial and rotative movements between the telescopic flanged members, and means carried by the protruding portions for moving the members into and out of engagement.

ADIEL Y. DODGE.